J. O. Scott.
Car Axle Box.
N° 42,881. Patented May 24, 1864.
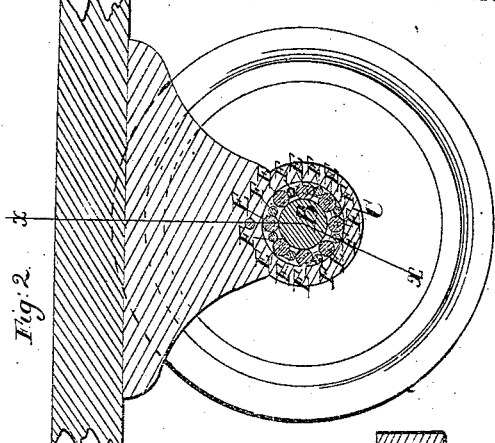
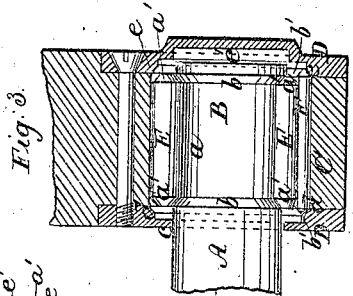
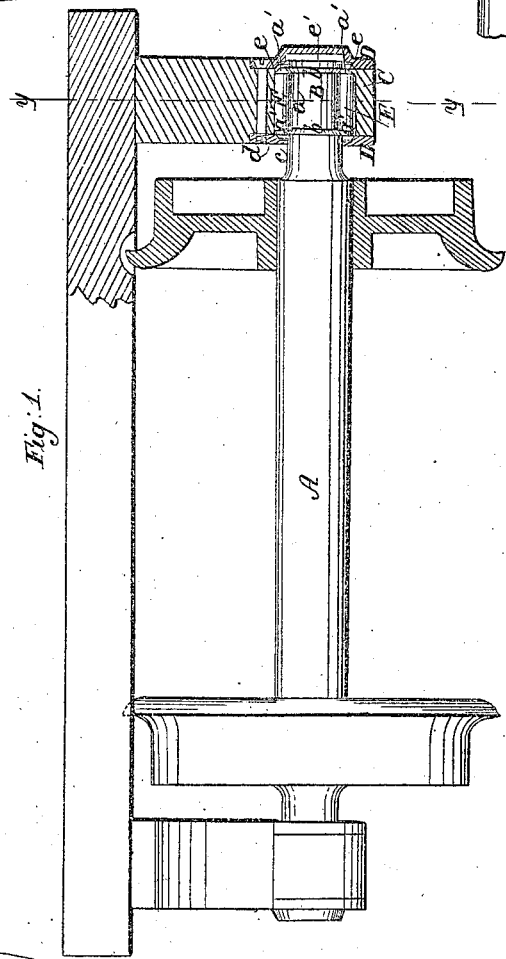
Witnesses;
Inventor;
John O. Scott

UNITED STATES PATENT OFFICE.

JOHN O. SCOTT, OF NEW YORK, N. Y.

IMPROVEMENT IN JOURNAL-BOXES FOR RAILROAD-CARS.

Specification forming part of Letters Patent No. 42,881, dated May 24, 1864.

*To all whom it may concern:*

Be it known that I, JOHN O. SCOTT, of the city, county, and State of New York, have invented a new and Improved Journal-Box for Railroad-Car Axles and Shafting Generally; and I do hereby declare that the following is a full, clear, and exact description of the same, reference being had to the accompanying drawings, making a part of this specification, in which—

Figure 1 is a sectional view of my invention, taken in the line $x\,x$, Fig. 2; Fig. 2, a sectional view of the same, taken in the line $y\,y$, Fig. 1; Fig. 3, an enlarged sectional view of the same, taken in the same line as Fig. 1—viz., $x\,x$, Fig. 2.

Similar letters of reference indicate corresponding parts in the several figures.

To enable those skilled in the art to fully understand and construct my invention, I will proceed to describe it.

A represents a car axle, and B one of its journals. The journals have a groove or recess, $a$, made circumferentially in them, extending nearly their whole length, the ends of the grooves or recesses being beveled, as shown at $b\,b$ in Figs. 1 and 3.

C represents the boxes in which the journals B are fitted and work or rotate. These boxes are provided with caps or plates D D', one at each side, the inner plate, D, having a circular hole, $c$, in it to allow the journals B to pass through, and also having an annular beveled surface, $d$, at its inner side, and concentric with the hole $c$. The outer plate, D', closes the outer sides of the boxes, and they have a circular recess, $e'$, in their inner sides in line with the holes $c$ in the inner plates, D. The inner surface of the plates D' also have an annular beveled surface, $e$, concentric with the recess $e$, and of the same diameter as the beveled surfaces $d$ of the inner plates, D.

E represents anti-friction-rollers, which are fitted in the grooves or recesses $a$ of the journals B, and have their ends $a'$ of conical form, so as to bear against the beveled ends $b\,b$ of the grooves or recesses $a$. (See Figs. 1 and 3.)

F represents rollers smaller in diameter than E, and fitted between the latter, so that there will be placed alternately a large and small roller all around the journals. The small rollers, F, are longer than the large ones, E, the former extending beyond the ends of the grooves or recesses $a$, and having their ends in contact with the beveled surface $d\,e$ of the plates D D', the ends $b'$ of the rollers F being of conical form to correspond to the beveled surfaces $d\,e$. The small rollers F are not designed to sustain any of the weight of the truck or car, but merely to keep the large rollers E in proper position, the latter at the top of the journals having the boxes C resting upon them, at which point the small rollers F bear upon the journals B beyond the ends of the grooves or recesses, said rollers, as well as the large rollers, E, resting or bearing upon the lower part of the boxes underneath the journals. (See Fig. 2.)

In consequence of having the ends of the rollers of conical form and to bear against beveled surfaces $b\,b\,d\,e$, the ends of the rollers are preserved from wear. By this arrangement it is believed that much friction is not only avoided, but the use of oil or other lubricating material is dispensed with. The rollers, in consequence of being placed free within the boxes or disconnected from each other, are not liable to become disarranged in any way, as is the case with those which are fitted in rings or frames.

I am aware that rollers of alternate large and small diameter have been before invented, but these have been placed in rings or frames, and this I do not claim. Such rings or frames necessarily increase the size of the box and also the expense, and prevent the ends of the rollers from being of useful service in reducing lateral friction.

Having thus described my invention, I claim and desire to secure by Letters Patent—

The employment of a series of loose conical-ended rollers, E F, between grooved journals B and boxes C, in the manner and for the purpose before stated and described.

JOHN O. SCOTT.

Witnesses:
THOS. S. J. DOUGLAS,
GEO. W. REED.